Dec. 22, 1970  B. D. HENDERSON  3,549,258
MONOCHROMATOR
Filed Sept. 5, 1968
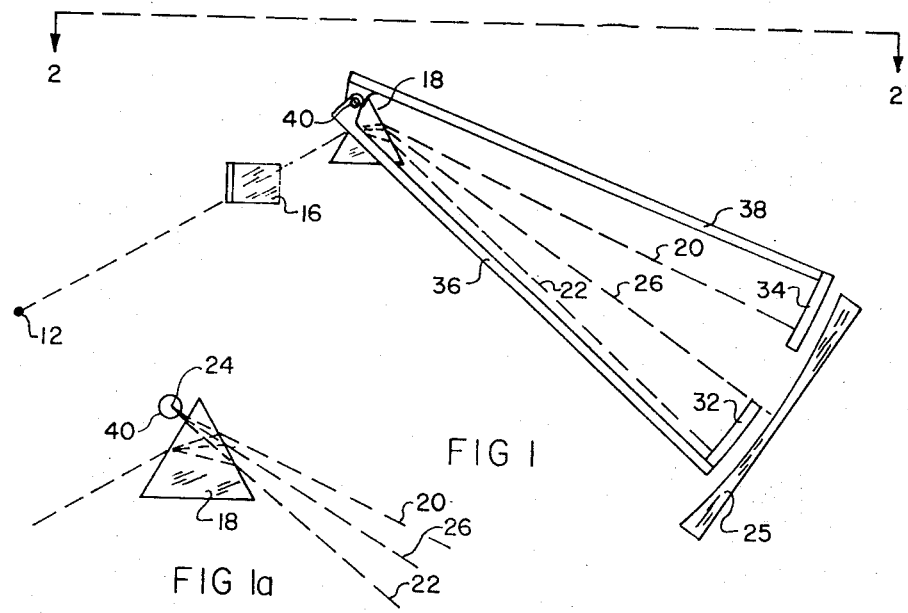
FIG 1
FIG 1a
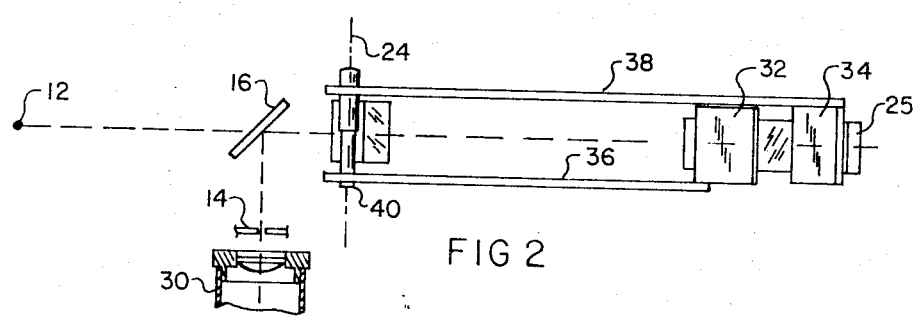
FIG 2
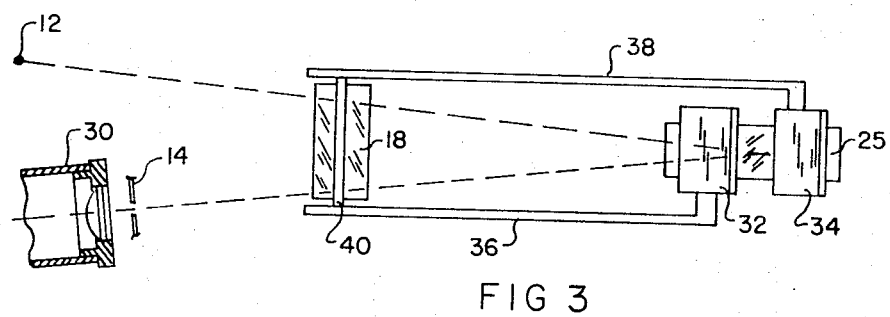
FIG 3
INVENTOR.
BILLIE D. HENDERSON
BY
ATTORNEY

# United States Patent Office 3,549,258
Patented Dec. 22, 1970

3,549,258
MONOCHROMATOR
Billie D. Henderson, La Habra, Calif., assignor to Beckman Instruments, Inc., a corporation of California
Filed Sept. 5, 1968, Ser. No. 757,660
Int. Cl. G01j 3/14
U.S. Cl. 356—100      5 Claims

ABSTRACT OF THE DISCLOSURE

A simple monochromator particularly suitable for use with a spot illumination device in microscopes is disclosed. A nearly collimated light bundle of small diameter impinges upon a prism in which it is dispersed. The dispersed radiation is reflected by a curved mirror whose center of curvature coincides with a point from which the dispersed rays seem to be emitted. A pair of slit jaws adjustably disposed in front of the miror eliminates unwanted wavelengths. A second pass of the reflected rays through the prism results in the re-formation of the nearly parallel bundle of small diameter having the desired wavelength composition.

CROSS-REFERENCE TO RELATED APPLICATION

The device of the present invention may be advantageously used in combination with a device for illumination of a small spot in the field of view of a microscope disclosed in my application Ser. No. 419,533 filed Dec. 18, 1964, Pat. No. 3,460,880, entitled Point Illumination and Scanning Mechanism for Microscopes and assigned to the assignee of the present application.

BACKGROUND OF THE INVENTION

Monochromasy in a relatively narrow bundle may be brought about by numerous arrangements such as monochromators using lenses or mirrors as focusing elements and prisms or gratings as dispersing elements. Autocollimation has been used in various forms, whereby the collimated bundle impinges twice upon a focusing element. Autocollimation is also possible by means of a prism having one silvered side so that the rays pass twice through the prism. In this case wavelength selection takes place by rotation of the prism so as to direct a particular wavelength to a stationary exit slit. In none of these known arrangements are slit jaws at or near the reflecting surface. Monochromasy can also be brought about by filters, but the latter are not quite as adaptable because every spectral range requires a different filter or filter combination.

SUMMARY OF THE INVENTION

It is an object of the invention to provide a monochromator that is simple, requires only a small prism and is very compact. Furthermore the monochromator of the invention provides excellent monochromasy due to its slit jaw arrangement and a very convenient selection of any desired spectral range.

The novel features thought to be characteristic of the invention are set forth with particularity in the appended claims. Objects and advantages of the invention can best be understood by references to the description and accompanying drawing of a preferred embodiment and a useful variation thereof.

BRIEF DESCRIPTION OF THE DRAWING

FIG. 1 is a schematic view of optical elements of a monochromator according to the invention also showing some ray paths essential to the understanding of the invention.

FIG. 2 is a view of the monochromator of FIG. 1 taken along the line 2—2.

FIG. 3 is a view of a somewhat different embodiment of a monochromator according to the invention shown under a viewing angle similar to that of FIG. 2.

DESCRIPTION OF PREFERRED EMBODIMENTS

In FIG. 1 radiation from a small, high intensity light source 12 is directed through a beam splitter 16, which may, for instance, comprise a half silvered mirror, or other suitable beam splitting device, placed at an angle of 45° with the optical axis. The half-silvered mirror provides high transmittance (close to 50%) for the rays that pass through the splitter and high reflectivity for those rays that are reflected 90° from the original direction.

The rays that pass through the beam splitter impinge upon a prism 18 wherein the rays are refracted. The longer wavelength rays such as the ray 20 undergo a smaller change of direction after passing through the prism than rays of shorter wavelength such as the rays 22.

It has been found that, with a sufficiently narrow bundle (as defined in this case by the entrance pupil 14 of the microscope eye piece 30 and its distance from the source 12, see FIG. 2) the dispersed rays 20, 22, 26, appear to come from a point 24, as best illustrated in FIG. 1a. While point 24 has been illustrated as lying outside the prism, it may lie within the prism, depending upon the design of the system. The position of this point is, however, unimportant to the invention. The divergence of the rays 20 and 22 and intermediate wavelength rays from a single, virtual, point 24 is not perfect, but the approximation is sufficiently close for the purpose of the device. In other words, though it is true that the rays 20 and 22 do not intersect at the same point that the rays 20 and 26 intersect, the points of intersection are not far apart. This is especially true in the/case the prism 18 is small which is always possible with the instrument of the invention, which will become readily apparent from the following.

A cylindrical mirror 25 is placed so that its center of curvature coincides with the point 24 from which the refracted rays seem to come. It will be apparent that the rays reflected back by the mirror 25 of different wavelength all strike the mirror surface perpendicularly. Obviously the rays coming from the source 12 would be all reflected back to the source if not for the beam splitter 16. The latter directs a portion of the rays that have passed the prism 24 twice towards a receiving device, such as an ocular 30 of a microscope shown in FIG. 2.

Selection of a particular wavelength range may be brought about by a pair of slit jaws 32 and 34 defining respectively the lower and upper wavelength limits of the radiation to be passed to the ocular.

The slit jaws 32 and 34 may be at any desired position by means of arms 36 and 38 that are rotatably mounted upon a shaft 40 that passes through the point 24 from which the diffracted rays seem to emerge. As explained in detail in application Ser. No. 419,533, the radiation directed to the ocular 30 may be utilized for brightly illuminating a small area of the field of view of a microscope.

The variation shown in FIG. 3 does not utilize a beam splitter and has the advantage of providing a better light output. A beam splitter has a maximum efficiency of 25% in this case, achievable when the reflectivity and the transmission are both 50%. However, in many cases the performance of a beam splitter may be considerably poorer.

In the embodiment of FIG. 3 the rays from the source 12 are located in a plane that is at an angle slightly different from 90° to the refracting edge of the prism 18. This results in the rays that are impinging upon the mirror to be no longer coincident with the reflected rays, so that the source 12 and the ocular 30 may be separate in space without the use of a beam splitter. This results in a much better light output at the sacrifice of only a slight loss in image quality.

Obviously other means such as a bright, small source and a spaced small diaphragm may be utilized for generating a narrow bundle of substantially collimated light. Further, one might use the combination of a relatively bright source, a collecting lens and a small diameter, second lens for rendering the collected light parallel. The second lens might be either positive or negative depending on its location with respect to the image of the source formed by the collecting lens. The source may be also a laser which provides directly a small collimated beam.

Though the mirror 25 has been described as cylindrical, it might also be spherical in which case the point 24 from which the refracted rays appear to emerge, is imaged on itself.

The best location of the point 24 may be found by ray tracing or computation or simply by experimentation if the obtaining of optimal monochromasy is of marginal or no interest.

Obviously the adjustment of the slit jaws 32 and 34 may be done in different ways. For instance the slit jaws might be rendered movable along an arcuate path by providing a suitable arcuate groove for them instead of pivoting them as shown. It is not even essential under all circumstances that the slit jaws be disposed in close proximity to the surface of the mirror 25 and they might be adjustable along a different, e.g., a straight path.

Whereas preferred embodiments and variants thereof have been shown and described, it will be obvious that embodiments other than those described or suggested in the foregoing are possible. In particular it should be noted that the concept of the invention is not restricted in its use to spot illumination in microscopes but can be utilized in many situations where a relatively narrow bundle of monochromatic radiation has to be formed with simple means. The invention itself is intended to be defined in and by the following claims.

What is claimed is:
1. A monochromator comprising:
   means for producing a first relatively narrow, substantially collimated beam of light,
   a prism having first and second surfaces intersecting at a refracting edge and disposed so as to receive said first collimated beam at said first surface and pass refracted rays away from said second surface,
   a curved mirror having its center of curvature disposed in an area wherein the refracted rays intersect, said curved mirror redirecting the refracted rays to said prism,
   slit jaw means disposed between said prism and said mirror for intercepting radiation of given wavelengths,
   and means for directing selected radiation that is reflected by said mirror and passed twice through said prism so as to form a second collimated beam along a path spaced from said means for producing a first near collimated beam of light.
2. The monochromator defined in claim 1 wherein said mirror is cylindrical.
3. The monochromator defined in claim 1 wherein said means for directing radiation reflected from said mirror and passed twice through said prism comprise a beam splitter interposed between said means for producing a collimated beam of light and said prism.
4. The monochromator defined in claim 1 wherein the first and second collimated beams intersect the first surface of said prism at first and second locations, said locations being spaced in the direction of the refracting edge of said prism.
4. The monochromator defined in claim 1 wherein said slit jaw means are rotatably mounted on an axis passing through the center of curvature of said mirror.

References Cited
UNITED STATES PATENTS

| | | | |
|---|---|---|---|
| 1,810,669 | 6/1931 | Loeb | 350—168X |
| 2,743,646 | 5/1956 | Strong | 356—99X |
| 2,835,167 | 5/1958 | Pierce | 350—87X |
| 3,122,602 | 2/1964 | Page | 240—1(M)X |

RONALD L. WIBERT, Primary Examiner

F. L. EVANS, Assistant Examiner

U.S. Cl. X.R.

356—168